United States Patent
Schreiber

(10) Patent No.: US 8,647,011 B2
(45) Date of Patent: *Feb. 11, 2014

(54) ENGINE SHAFT OF HYBRID DESIGN

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 353 days.

This patent is subject to a terminal disclaimer.

(21) Appl. No.: 12/855,095

(22) Filed: Aug. 12, 2010

(65) Prior Publication Data

US 2011/0038666 A1   Feb. 17, 2011

(30) Foreign Application Priority Data

Aug. 13, 2009   (DE) .......................... 10 2009 037 049

(51) Int. Cl.
*A47B 96/06*   (2006.01)

(52) U.S. Cl.
USPC ............ 403/339; 464/183; 464/902; 156/149

(58) Field of Classification Search
USPC ............. 403/28–30, 242, 263, 280, 281, 282, 403/339; 464/181, 183, 902, 903; 156/148, 156/149, 169, 172, 173, 175, 304.1, 304.5
See application file for complete search history.

(56) References Cited

U.S. PATENT DOCUMENTS

| 4,421,497 A | 12/1983 | Federmann et al. | |
|---|---|---|---|
| 4,663,819 A | 5/1987 | Traylor | |
| 4,704,918 A * | 11/1987 | Orkin et al. | 74/579 R |
| 4,834,693 A | 5/1989 | Profant et al. | |
| 5,018,915 A * | 5/1991 | Inokuma et al. | 409/231 |
| 5,122,337 A * | 6/1992 | Lund et al. | 420/123 |
| 5,320,579 A | 6/1994 | Hoffmann | |
| 5,322,580 A * | 6/1994 | McIntire et al. | 156/148 |
| 5,407,119 A * | 4/1995 | Churchill et al. | 228/124.5 |
| 5,840,386 A * | 11/1998 | Hatch et al. | 428/36.9 |
| 6,468,003 B2 * | 10/2002 | Merjan et al. | 405/253 |
| 6,927,586 B2 * | 8/2005 | Thiessen | 324/755.11 |
| 7,267,258 B2 * | 9/2007 | Pfeiler | 228/112.1 |
| 7,419,435 B2 * | 9/2008 | Borges et al. | 464/181 |
| 2007/0213136 A1 | 9/2007 | Borges et al. | |
| 2008/0064511 A1 * | 3/2008 | Brace et al. | 464/181 |
| 2010/0113171 A1 * | 5/2010 | Schreiber et al. | 464/183 |

FOREIGN PATENT DOCUMENTS

| CA | 2131386 | 11/1993 |
|---|---|---|
| DE | 4119359 | 1/1992 |
| DE | 69304689 | 4/1997 |
| EP | 0029093 | 5/1981 |
| EP | 1083345 | 3/2001 |
| EP | 1231391 | 8/2002 |
| EP | 1900946 | 3/2008 |
| JP | 63166519 | 7/1988 |
| WO | 9322127 | 11/1993 |

* cited by examiner

*Primary Examiner* — Gregory Binda
*Assistant Examiner* — Nahid Amiri
(74) *Attorney, Agent, or Firm* — Timothy J. Klima; Shuttleworth & Ingersoll, PLC

(57) ABSTRACT

On an engine shaft of hybrid design with an externally toothed power transmission element connected at the ends of a fiber-composite plastic tube, the power transmission element is of a two-part design and includes a toothed part made of steel of a specific hardness and, frontally weldedly connected thereto, a tapering adapter part enclosed by a fiber-composite material to form a scarf-type joint and having a thermal expansion approximately equal to the expansion behavior of the fiber-composite material.

18 Claims, 1 Drawing Sheet

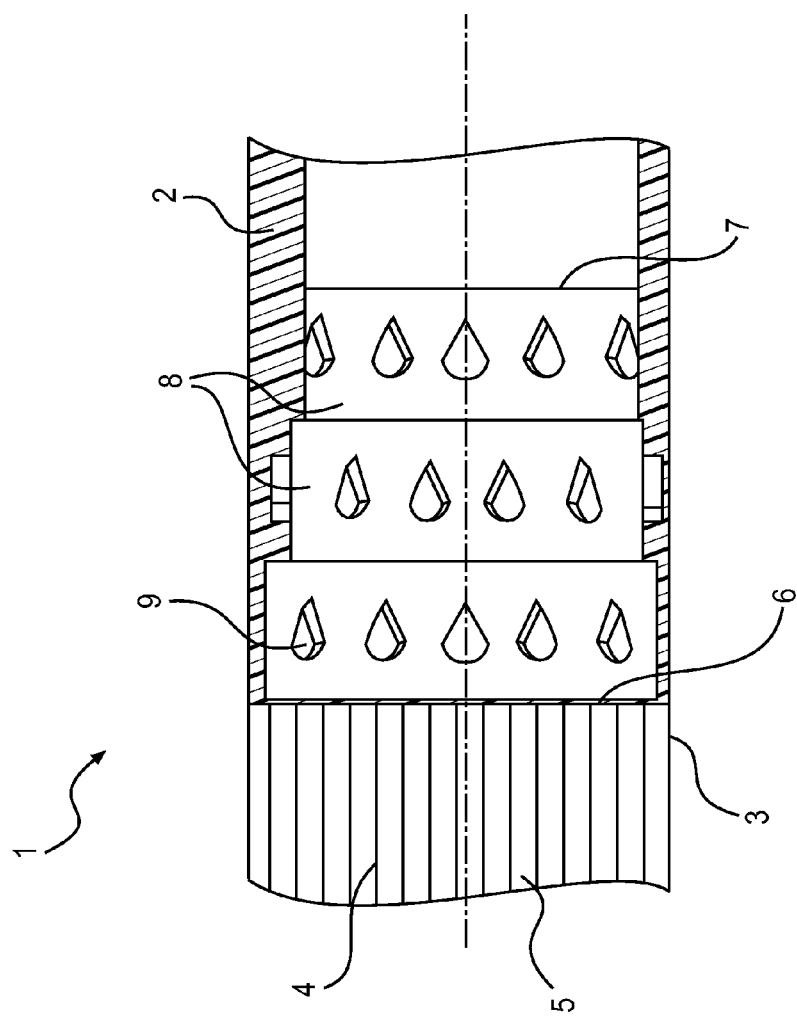

ENGINE SHAFT OF HYBRID DESIGN

BACKGROUND OF THE INVENTION

This application claims priority to German Patent Application DE102009037049.8 filed Aug. 13, 2009, the entirety of which is incorporated by reference herein.

This invention relates to an engine shaft of hybrid design, more particularly the low-pressure shaft or the radial shaft of a gas-turbine engine, including a fiber-composite plastic tube connected at the ends with an externally toothed power transmission element.

In order to enable high torques to be operationally safely transmitted while keeping with reduced weight and limited outer diameter of the engine shafts of gas-turbine engines, it has been proposed to make the engine shaft of a fiber-composite plastic tube, which is made essentially of carbon fibers, and load-input and load-output elements, which are made of steel and inseparably incorporated at the ends into the fiber-composite and toothed at the free outer surface. Connection between the fiber-composite material and the metallic power transmission element is provided by a conically tapering adapter formed on the latter, providing a scarf-type joint with gradual transition between a prevailing fiber area to a prevailing metallic area. For the transmission of a maximum of torsional forces via the small connecting area, pylons are formed on the outer surface of the conical adapter at which the fibers are re-directed and routed according to the fiber orientation in the fiber-composite material.

BRIEF SUMMARY OF THE INVENTION

In a broad aspect, the present invention provides an engine shaft of hybrid design made of a fiber-composite plastic tube and a steel power transmission element such that in engine operation, also at elevated temperatures, intimate and firm connection between the fiber-composite material and the power transmission element as well as safe power transmission and a long service life of the engine shaft are ensured.

In the present invention, the power transmission element is attached to the shaft ends of a fiber-composite plastic tube and is of two-part design, including a toothed part made of steel of a specific hardness and, frontally weldedly connected thereto, a tapering adapter part enclosed by the fiber-composite material to form a scarf-type joint and having a thermal expansion approximately equal to the expansion behavior of the fiber-composite material. The approximately equal thermal expansion of the material combination in the connecting area in conjunction with the opposing change in material thickness provided by the scarf-type joint ensures, also at high operating temperatures, safe transmission of high forces and reduction of stresses between the different materials in the connecting area as well as a long service life of the shaft.

In a further embodiment of the present invention, the fiber-composite material is made of carbon fibers embedded in a high-temperature resistant resin system and the adapter part of an Invar alloy, with the respective thermal expansion coefficients thereof being nearly zero and approximately equal.

In development of the present invention, the toothed part and the adapter part are joined to each other by a rotational friction weld.

In a further development of the present invention, pylons for routing and retaining the fibers of the fiber-composite material are provided on the periphery of the adapter part.

In yet another development of the present invention, the taper of the adapter part is provided in steps and the pylons are disposed on the steps.

In a further development of the present invention, the toothed part is made of case-hardening steel.

The present invention is more fully described in light of the accompanying drawing, showing a preferred embodiment.

BRIEF DESCRIPTION OF THE DRAWING

The FIGURE schematically illustrates an engine shaft of hybrid-design in the area of the connection between the power transmission element and the fiber-composite plastic tube.

As shown in the FIGURE, the engine shaft 1 includes a fiber-composite plastic tube 2 made of CFRP, i.e. carbon fibers embedded in a plastic matrix, and a power transmission element 3 in steel connected to the fiber-composite plastic tube 2 at the ends of the engine shaft 1. The power transmission element 3 has a toothing 4 to engage the engine shaft—employed for example as low-pressure turbine shaft—with a gear drive and drive the fan of a gas-turbine engine. The power transmission element 3 is of a two-part design and includes a toothed part 5 made of steel of a certain hardness, for example case-hardening steel, and an adapter part 7 frontally joined thereto by a rotational friction weld 6. The adapter part 7 connected to the fiber-composite plastic tube 2 is tapered in steps 8 in the longitudinal direction of the engine shaft 3 to provide a gradual transition between the two, dissimilar materials (steel and fiber-composite material). On each step, circumferentially disposed pylons 9 are arranged about which the carbon fibers of the carbon-fiber plastic tube 2 are placed, thus making an intimate and firm connection between the fiber-composite material and the power transmission element. The separately manufactured, tapering adapter part 7 is made of an iron-nickel alloy designated Invar® steel (generically, 64FeNi) whose thermal expansion coefficient is approx. $2\times10^{-6}K^{-1}$ at 20° C. and, therefore, approximately in the range of the thermal expansion of the carbon fibers (expansion coefficient $\alpha=0+/-1\ 10^{-6}K^{-1}$) of the fiber-composite plastic tube 2. The synergetic effect of the scarf-type joint, which provides for low shear stresses and uniform transmission thereof, and the embodiment of the connecting elements in materials with equal, i.e. close to zero, thermal expansion ensures, also at elevated temperatures, firm connection and safe transmission of the very high forces between the fiber-composite plastic tube and the power transmission element or, respectively, the drive side and the driven side of the engine shaft, despite the wide temperature range of −50° C. to +180° C. (for a radial shaft) or, respectively, +250° C. (for a low-pressure shaft) in which the engine shaft 1 is operated. Furthermore, residual differences in thermal expansion are compensated for by the scarf-type design (opposing wall thicknesses) in the connecting area between the adapter part 7 and the fiber-composite plastic tube 2.

LIST OF REFERENCE NUMERALS

1 Engine shaft
2 Fiber-composite plastic tube
3 Power transmission element
4 Toothing
5 Toothed part
6 Rotational friction weld
7 Adapter part
8 Steps of 7
9 Pylons

What is claimed is:

1. An engine shaft of hybrid design, comprising:
   a power transmission element having:
   an externally toothed part at least partly made of a hardened steel for engaging a corresponding toothed part of a further engine shaft; and
   a metal adapter part made of a different metal than the toothed part and welded to the toothed part, the adapter part having a decreasing diameter as it extends away from the toothed part;
   a tube of fiber-composite material connected at one end with the adapter part such that the fiber-composite material encompasses the adapter part to form an overlapping joint;
   wherein, the adapter part has a thermal expansion approximately equal to an expansion behavior of the fiber-composite material.

2. The engine shaft of claim 1, wherein the fiber-composite material comprises carbon fibers embedded in a high-temperature resistant resin system and the adapter part is constructed of 64Fe-36Ni alloy, with respective thermal expansion coefficients of the fiber-composite material and the adapter part being nearly zero and approximately equal.

3. The engine shaft of claim 2, wherein the adapter part includes a plurality of protruding pylons positioned on a periphery of the adapter part for routing and retaining the fiber-composite material.

4. The engine shaft of claim 3, wherein the decreasing diameter of the adapter part is formed by a plurality of steps of decreasing size.

5. The engine shaft of claim 4, wherein the pylons are positioned on the steps.

6. The engine shaft of claim 5, wherein the engine shaft is shaft of a gas-turbine engine.

7. The engine shaft of claim 6, wherein the toothed part is made of case-hardening steel.

8. The engine shaft of claim 7, wherein the toothed part and the adapter part are joined to each other by a rotational friction weld.

9. The engine shaft of claim 1, wherein the adapter part includes a plurality of protruding pylons positioned on a periphery of the adapter part for routing and retaining the fiber-composite material.

10. The engine shaft of claim 9, wherein the decreasing diameter of the adapter part is formed by a plurality of steps of decreasing size.

11. The engine shaft of claim 10, wherein the pylons are positioned on the steps.

12. The engine shaft of claim 11, wherein the engine shaft is a shaft of a gas-turbine engine.

13. The engine shaft of claim 12, wherein the toothed part is made of case-hardening steel.

14. The engine shaft of claim 13, wherein the toothed part and the adapter part are joined to each other by a rotational friction weld.

15. The engine shaft of claim 1, wherein the decreasing diameter of the adapter part is formed by a plurality of steps of decreasing size.

16. The engine shaft of claim 1, wherein the engine shaft is a shaft of a gas-turbine engine.

17. The engine shaft of claim 1, wherein the toothed part is made of case-hardening steel.

18. The engine shaft of claim 1, wherein the toothed part and the adapter part are joined to each other by a rotational friction weld.

* * * * *